United States Patent [19]

Hibino et al.

[11] Patent Number: 4,493,192
[45] Date of Patent: Jan. 15, 1985

[54] OPERATION DEVICE FOR ABSORPTION COLD AND WARM WATER SYSTEM UTILIZING SOLAR HEAT

[75] Inventors: Yozo Hibino; Kohji Kamejima, both of Ibaraki; Yasuaki Nara, Tsuchiura, all of Japan

[73] Assignee: Hitachi, Ltd., Tokyo, Japan

[21] Appl. No.: 493,503

[22] Filed: May 11, 1983

[30] Foreign Application Priority Data

May 12, 1982 [JP] Japan .................................. 57-78285

[51] Int. Cl.³ .......................... F25B 15/00; F25B 27/00
[52] U.S. Cl. ........................................ 62/141; 62/148; 62/235.1; 62/476
[58] Field of Search ...................... 62/141, 148, 235.1, 62/476

[56] References Cited

U.S. PATENT DOCUMENTS

| | | | |
|---|---|---|---|
| 2,850,266 | 9/1958 | Merrick et al. | 62/148 X |
| 3,005,318 | 10/1961 | Miner | 62/141 |
| 3,122,002 | 2/1964 | Miner et al. | 62/141 |
| 3,300,999 | 1/1967 | Reid, Jr. | 62/141 |
| 3,837,174 | 9/1974 | Miyagi et al. | 62/141 |
| 4,280,331 | 7/1981 | Yoshii et al. | 62/148 |
| 4,329,851 | 5/1982 | Bourne | 62/235.1 |

Primary Examiner—Lloyd L. King
Attorney, Agent, or Firm—Antonelli, Terry & Wands

[57] ABSTRACT

An absorption cold and warm water system utilizing solar heat includes a low temperature heat generator using as a heating source low temperature warm water obtained by heating water by the solar heat, a high temperature generator using an ancillary heat source as a heating source when the system runs short of the solar heat, and a low temperature generator. The cold and warm water system is provided with an operation device operative, when the cold and warm water system is in condition in which refrigerating and heating outputs can be provided by using the low temperature warm water, to allow the low temperature warm water to be continuously fed to the cold and warm water system and to control the volume of a solution and a refrigerant in circulation in accordance with temperatures of the cold and warm water, to thereby store the solar heat in the cold and warm water system.

9 Claims, 3 Drawing Figures

OPERATION DEVICE FOR ABSORPTION COLD AND WARM WATER SYSTEM UTILIZING SOLAR HEAT

BACKGROUND OF THE INVENTION

This invention relates to an operation device for an absorption cold and warm water system using as a main heat source a low temperature warm water provided by utilizing solar heat while using vapor or a fuel as an ancillary heat source.

An absorption cold and warm water system provided with a generator using as a heating source a low temperature warm water obtained by utilizing solar heat is described in, for example "REFRIGERATING AND AIR CONDITIONING TECHNOLOGY", Vol. 32, No. 371, a Japanese magazine published in January 1981.

In absorption cold and warm water systems of the prior art provided with a low temperature heat source generator using as a heating source a low temperature warm water provided by utilizing solar heat, it is known that, when the cold and warm water system had a reduced load and had an ample supply of solar heat, the solar heat would become redundant if the supply of the low temperature warm water to the cold and warm water system were interrupted. To cope with this situation, proposals have been made to adopt the following measures. However, these measures are not without disadvantages.

One solution would be to render the solar heat collector inoperative by interrupting a supply of water thereto, to thereby keep the solar heat collector from collecting solar heat. When this solution is adopted, however, the temperature of the solar heat collector would show an inordinate rise, and this would make it impossible to pass water to the solar heat collector as soon as the load of the cold and warm water increases. Thus, this would make it impossible to suitably cope with variations in load.

Another solution would be to dispose of the collected heat by utilizing a cooling tower while allowing water to be passed to the solar heat collector. This solution would be against the principle of fuel conservation because power required for running the motor of the cooling tower would be wasted, thereby defeating the purpose of utilizing inexpensive solar heat.

Still another solution would be to provide a heat storage tank for storing heat in an amount corresponding to the difference between the amount of solar heat collected by the solar heat collector and the load of the cold and warm water system. The heat storage tank serving this purpose would be quite high in capacity, thereby increasing installation cost.

In view of the foregoing, attempts have been made to combine these solutions into a single process for obviating the trouble. However, no satisfactory results have been obtained.

SUMMARY OF THE INVENTION

An object of this invention is to provide an operation device for an absorption cold and warm water system utilizing solar heat capable of utilizing a solar heat source to the full.

Another object is to provide an operation device for an absorption cold and warm water system utilizing solar heat capable of avoiding releasing of excess solar heat even when the system is under partial load.

Still another object is to provide an operation device for an absorption cold and warm water system utilizing solar heat capable of contributing to energy conservation.

To accomplish the aforesaid objects, the invention provides, an operation device is provided in an absorption cold and warm water system utilizing solar heat, with the system comprising a low temperature heat source generator using as a heating source low temperature warm water provided by heating water by the solar heat, a high temperature generator using an ancillary heat source as a heating source when the cold and warm water system becomes short of solar heat, and a low temperature generator. The operation device comprises a low temperature warm water pump for introducing low temperature warm water into the low temperature heat source generator, means for adjusting flow rate of and feeding a dilute solution produced in an absorber to the generators, means for adjusting the flow rate of a refrigerant of the evaporator in circulation, and a control section operative to continuously drive the low temperature warm water pump when the cold and warm water system is in condition in which refrigerating and heating outputs can be provided by using the temperature warm water and effecting control of the solution flow rate adjusting and feeding means and the refrigerant flow rate adjusting means, so as to prevent the temperatures of the cold and warm water, refrigerant and solution from exceeding predetermined levels in accordance with a supply of the cold and warm water to a load by using cold and warm water temperature provided by the cold and warm water system and a refrigerant temperature.

Additional and other objects, features and advantages of the invention will become more apparent from the description set forth hereinafter when considered in conjunction with the accompanying drawings.

DESCRIPTION OF THE PREFERRED EMBODIMENT

Figure 1:
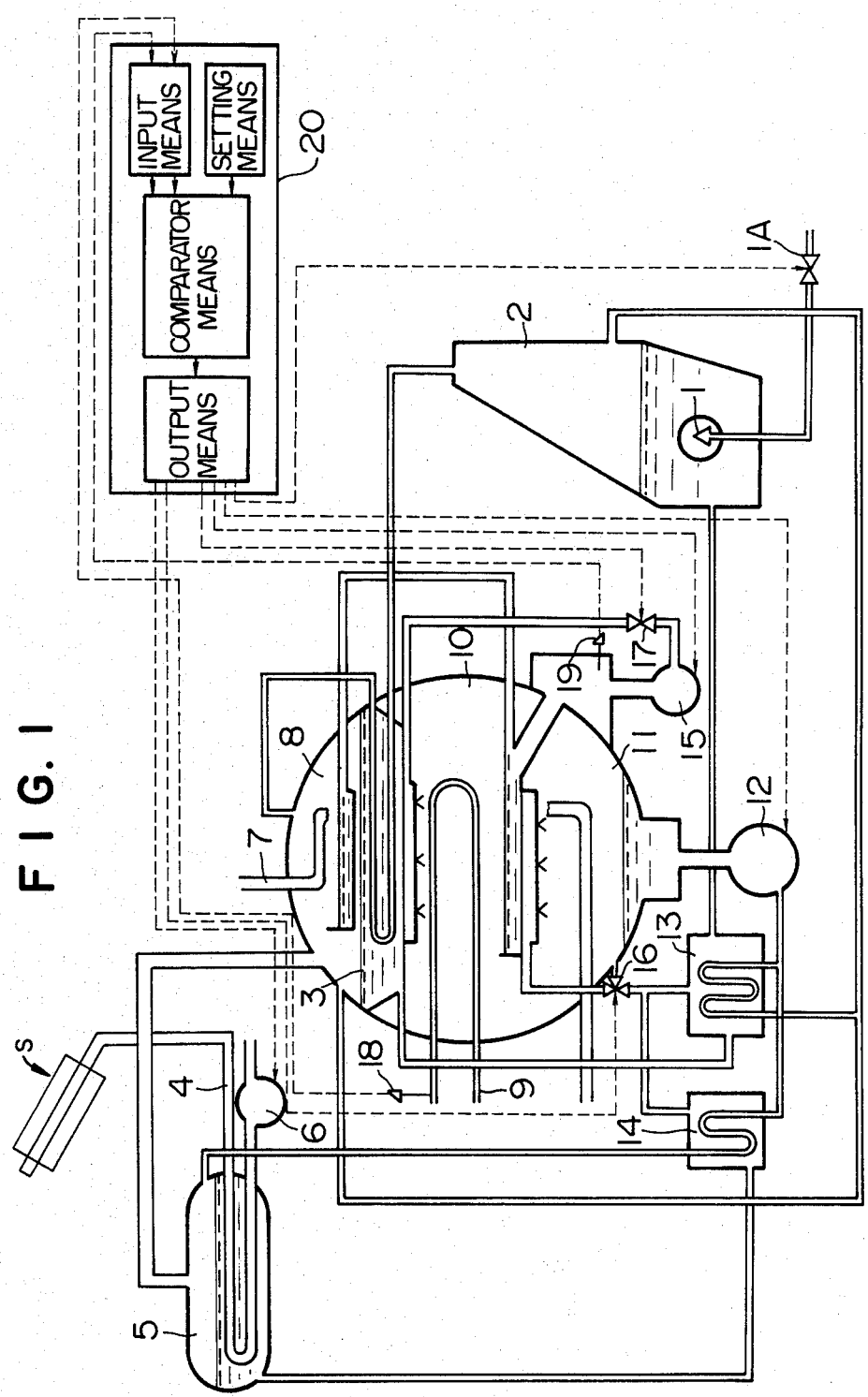
FIG. 1 is a systematic view of the absorption cold and warm water system utilizing solar heat incorporating therein an operation device in accordance with an embodiment of the invention.

A preferred embodiment of the invention will be described by referring to the drawings.

As shown in FIG. 1, an absorption cold and warm water system comprises a high temperature generator 2 for generating refrigerant vapor (water vapor) by heating a dilute solution by means of an ancillary heating source 1, a low temperature generator 3 for generating refrigerant vapor (water vapor) by heating a dilute solution with the refrigerant vapor generated by the high temperature generator 2, a low temperature heat source generator 5 for generating refrigerant vapor (water vapor) by heating a dilute solution with low temperature warm water formed in a low temperature warm water pipe 4 heated by solar heat, a low temperature warm water pump 6 introducing low temperature warm water into the low temperature heat source generator 5, a condenser 8 condensing into a condensate the refrigerant vapor generated in the generators 2, 3 and 5 with cooling water flowing through a cooling water pipe 7, an evaporator 10 for vaporizing the condensate or refrigerant in a liquid state obtained at the condenser 8 to produce cold water (coldness) by depriving water flowing through a cold water pipe 9 of latent heat of vaporization, an absorber 11 for producing a dilute solution by causing a concentrated solution led from the generators 2, 3 and 5 to absorb the refrigerant vapor provided by vaporization at the evaporator 10 while effecting cooling with the cooling water flowing through the cooling water pipe 7, a solution pump 12 for feeding the dilute solution produced at the absorber 11 to the generators 2, 3 and 5, a high temperature heat exchanger 13 and a low temperature heat exchanger 14 allowing heat exchange to take place between the dilute solution fed from the absorber 11 to the generators 2, 3 and 5 and the concentrated solution returning from the generators 2, 3 and 5 to the absorber 11, and a refrigerant pump 15 for causing the refrigerant in the evaporator 10 to circulate. The absorption cold and warm water system utilizing solar heat further comprises a valve 16 for controlling circulation and spraying of the solution, and a valve 17 for controlling circulation and spraying of the refrigerant. A sensor 18 senses an outlet temperature of the cold water flowing through the cold water pipe 9, and with a sensor 19 sensing an outlet temperature of the refrigerant. A control section 20 is operative to effect control of a fuel supply valve 1A of the ancillary heating source 1, the low temperature warm water pump 6, solution pump 12, refrigerant pump 15 and valves 16 and 17 based on signals produced by the sensors 18 and 19 representing the results of sensing. The control section 20 comprises a setting means for setting values from outside, an input means for inputting current values of temperature in predetermined positions, a comparator means for comparing the set values with the current values and an output means for providing predetermined control signals based on the results of comparison. Thus, the control section 20 may be in the form of an electromagnetic relay circuit or an electronic circuit.

Operation of the control section 20 of the aforesaid constructional form will be described by referring to a time chart shown in FIG. 2.

Figure 2:
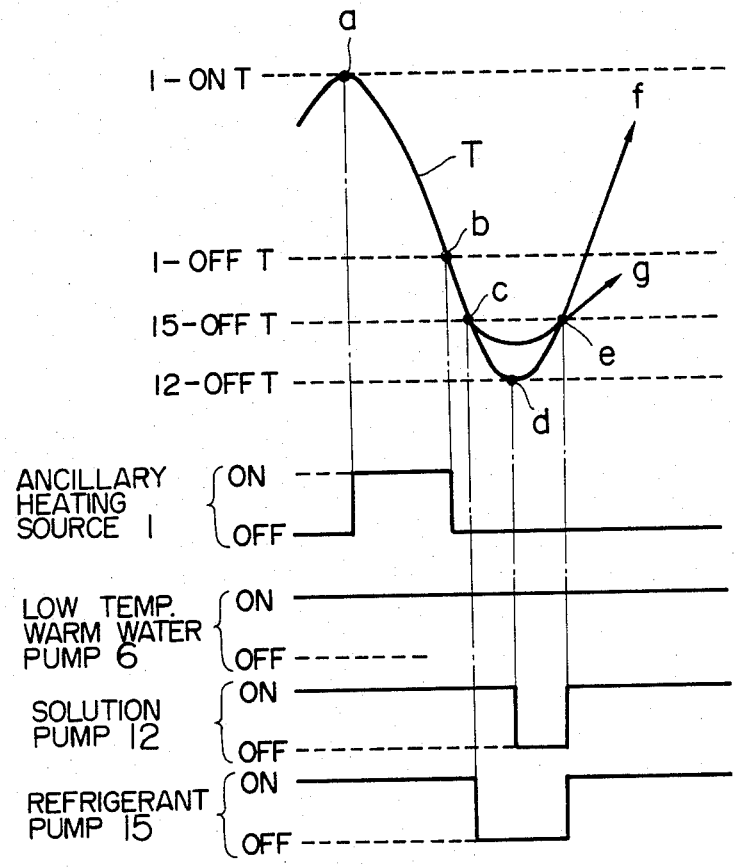
FIGS. 2 and 3 are time charts in explanation of the operation of examples of the control section of the operation device according to the invention.

In the time chart shown in FIG. 2, a temperature 1-ON T for turning on the ancillary heating source 1, a temperature 1-OFF T for turning off the ancillary heating source 1, a temperature 15-OFF T for turning off the refrigerant pump 15 and a temperature 12-OFF T for turning off the solution pump 12 are set from above in the indicated order with regard to the cold water temperature. The control operation effected according to the invention will be described by referring to changes in cold water temperature T. The cold water temperature T is sensed by the sensor 18 and the result is inputted to the control section 20. As the cold water temperature rises and reaches a point a, the control section 20 turns on the ancillary heating source 1, to thereby produce coldness and cause the cold water temperature to drop. As the cold water temperature reaches a point b, the control section 20 turns off the ancillary heating source 1. If the amount of heat supplied to the low temperature heat source generator 5 by low temperature warm water obtained by heating water by solar heat at this time is ample, then the cold water temperature further drops. If the cold water temperature drops to a point c, the refrigerant might be supercooled. Thus, the control section 20 renders the refrigerant pump 15 inoperative based on a refrigerant temperature from the sensor 19. This reduces the amount of coldness produced, so that the cold water temperature rises from a point e to a point g if the load is high. In this case, if the refrigerant pump 15 is driven again at a certain cold water temperature level, coldness would be produced. However, a rise in the cold water temperature can be restrained if heat is supplied in ample amount to the system by the low temperature warm water at this time. Meanwhile, when the load is low, the cold water temperature drops from point c to a point d. As the cold water temperature reaches point d, the control section 20 renders the solution pump 12 inoperative. This completely puts an end to the production of coldness, allowing the cold water temperature to rise from point d to point f. In this case, if the solution pump 12 is driven and the refrigerant pump 15 is also driven at a certain cold water temperature level, coldness is produced. If heat is supplied in ample amount to the system by the low temperature warm water at this time, a rise in the cold water temperature can be prevented. In the process described above, the low temperature warm water provided by heating water by the solar heat is continuously supplied to the system when it is desirable to do so or when the low temperature warm water has a higher temperature than the solution in the low temperature heat source generator 5. If coldness is produced by the low temperature warm water and the cold water temperature drops, particularly when the system is at partial load, then the refrigerant pump 15 is first rendered inoperative at a lowest possible set value of the cold water temperature that might not cause any trouble to operation of the absorption cold and warm water system, and thereafter the solution pump 12 is rendered inoperative at a much lower set value of the cold water temperature. In this case, the refrigerant temperature may be used in place of the cold water temperature. In the process described hereinabove, the cold water temperature is kept at a level over the predetermined value and the heat of the low temperature warm water is effectively stored in the form of a rise in the temperature of the solution or as a rise in the concentration thereof when the cold water temperature drops. The accumulated energy can be withdrawn as coldness when the refrigerant pump 15 and the solution pump 12 are rendered operative again, thereby allowing a delay in a turning on of the ancillary heating source 1.

Another form of operation of the control section 20 will be described by referring to FIG. 3.

Figure 3:
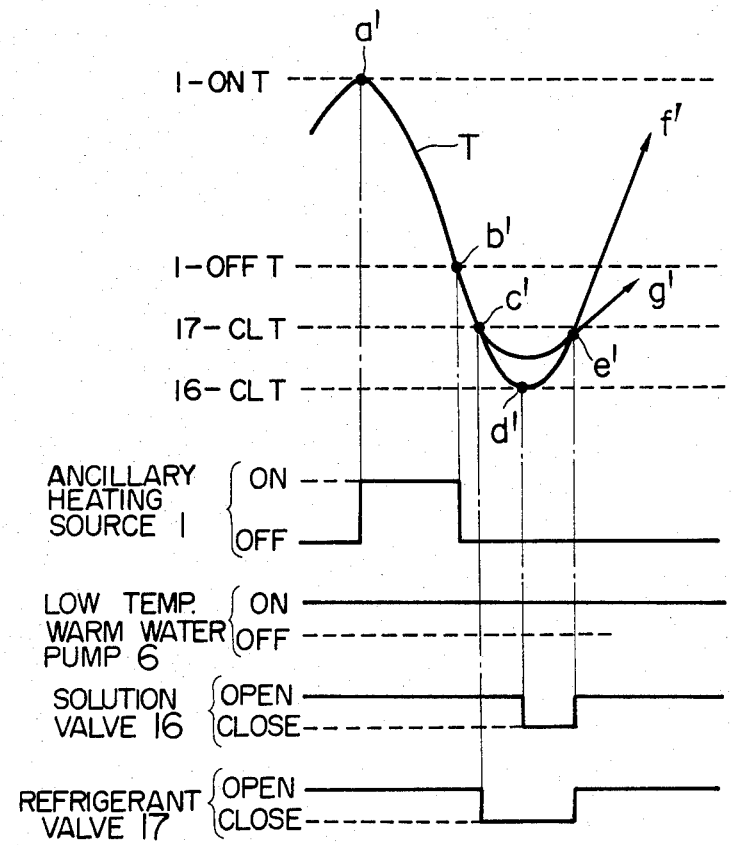

In another form of operation of the control section 20, as shown in FIG. 3, a temperature 1-ON T for rendering the ancillary heating source 1 100% operative, a temperature 1-OFF T for turning off the ancillary heating source 1, a temperature 17-CL T for closing the refrigerant volume adjusting valve 17 to a predetermined position and a temperature 16-CL T for closing the solution volume adjusting valve 16 to a predetermined position are set from above in the indicated order with regard to the cold water temperature. The control operation of the modified form will be described by referring to changes in the cold water temperature T. As the temperature of the cold water rises and reaches a point a', the control section 20 effects control such that the ancillary heating source 1 is rendered 100% operative. This produces coldness and causes the cold water temperature to drop. As the cold water temperature reaches a point b', the control section 20 turns off the ancillary heating source 1. In this case, the cold water temperature further drops if the amount of heat supplied to the low temperature heat source generator 5 by low temperature warm water obtained by heating water by solar heat at this time is ample. If this phonomen occurred and the temperature of the cold water were allowed to drop to a point c', the refrigerant might be supercooled. Thus, the control section 20 closes the valve 17 to a predetermined position to adjust the volume of the refrigerant. The valve 17 may be closed either continuously or step by step, depending on the cold water temperature. This reduces the coldness that is produced, and the cold water temperature rises to a point g' from a point e' if the load is high. If the valve 17 for adjusting the volume of the refrigerant is opened at this time, coldness can be produced. However, if the amount of heat supplied by the low temperature warm water is ample, it is possible to check or restrain a rise in the cold water temperature. Meanwhile, if the load is low, the cold water temperature drops from point c' to a point d'. Upon the cold water temperature reaching point d', the control section 20 closes the valve 16 to a predetermined position to adjust the volume of the solution in circulation or the volume thereof that is sprayed. The valve 16 may be closed either continuously or step by step, depending on the temperature of the cold water. This interrupts the production of coldness, so that the cold water temperature rises from point d' to point f' again. At this time, if the valve 16 for adjusting the volume of the solution is opened again and the valve 17 for adjusting the volume of the refrigerant in circulation is additionally opened while the amount of heat supplied by the low temperature warm water is ample, it is possible to check or restrain a rise in the temperature of the cold water. In the process described hereinabove, the low temperature warm water may be continuously supplied when it is advisable to do so or when the temperature of the low temperature warm water obtained by heating water by solar heat is higher than the temperature of the solution in the low temperature heat source generator 5.

In the embodiment described hereinabove, the invention has been described by referring to an application in which a refrigerating output is provided or cold water is produced. It is to be understood, however, that the invention may have application in the production of a heating output or warm water. In producing a heating output, the invention may have application in an absorption heat pump utilizing solar heat in which low temperature warm water obtained by heating water by solar heat is passed to the evaporator 10 and utilized through the heat source water passed to the low temperature heat source generator 5 or a main heat source to produce warm water.

From the foregoing description, it will be appreciated that control can be effected according to the invention in such a manner that when the cold and warm water system is in condition in which a refrigeration or a heating output can be provided by the low temperature warm water obtained by heating water by the solar heat, adjustments of the volume of the refrigerant or solution that is sprayed or circulated are effected while continuously supplying the low temperature warm water to the system, to thereby prevent the temperature of cold or warm water or the temperature of the refrigerant or solution from exceeding a predetermined temperature level. Thus, the invention has the effect of enabling the solar heat to be utilized to the full by the cold and warm water system to thereby economize on using the ancillary heating source. This is conducive to marked energy conservation.

What is claimed is:

1. An operation device for an absorption cold and warm water system utilizing solar heat, with the system comprising a low temperature heat source generator using as a heating source low temperature warm water provided by heating water by the solar heat, a high temperature generator using an ancillary heat source as a heating source when the cold and warm water system becomes short of solar heat, a low temperature generator, and evaporator, and a condenser; the operation device comprising:
   a low temperature warm water pump for introducing low temperature warm water into said low temperature heat source generator;
   solution adjusting and feeding means for adjusting quantities of a concentrated solution fed to an absorber and of a dilute solution fed to said generators and feeding the adjusted quantities of solutions to said absorber and said generators, respectively;
   refrigerant adjusting means for adjusting a quantity of refrigerant which is caused to circulate in the evaporator; and
   a first detection means for detecting the temperature of cold and warm water outputted from said cold and warm water system;
   a second detection means for detecting the temperature of refrigerant; and
   a control section for controlling the operation of said low temperature warm water pump, solution adjusting and feeding means and refrigerant adjusting means in dependence upon values detected by at least one of said first and second detection means, said control section being operative to continuously drive said low temperature warm water pump when the temperature of the low temperature warm water is higher than the temperature of the dilute solution in the low temperature heat source generator so as to enable a heating of the dilute solution by the low temperature warm water, and to effect control of said solution adjusting and feeding means and said refrigerant adjusting means, so as to prevent the temperatures of the cold and warm water, refrigerant and solution from exceeding predetermined levels in the process of controlling the temperatures of the cold and warm water fed to a load to a desired value through heating by the low temperature warm water, upon insufficient heating by the low temperature warm water, to cause a heating by the ancillary heat source.

2. An operation device as claimed in claim 1, wherein said control section is adapted to effect control, when the cold water temperature drops below a predetermined temperature level, of said refrigerant adjusting means to prevent a further drop in the cold water temperature.

3. An operation device as claimed in claim 1, wherein said control section is adapted to effect control, when the temperature of the refrigerant drops below a predetermined temperature level, of said refrigerant adjusting means to prevent a further drop in the refrigerant temperature.

4. An operation device as claimed in claim 1, wherein said control section is adapted to effect control, when the cold water temperature drops below a predetermined temperature level, of said solution adjusting and feeding means to prevent a further drop in the cold water temperature.

5. An operation device as claimed in claim 1, wherein said control section is adapted to effect control, when the temperature of the refrigerant drops below a predetermined temperature level, of said solution adjusting and feeding means to prevent a further drop in the temperature of the refrigerant.

6. An operation device as claimed in claim 1, wherein said control section is adapted to effect control, when the warm water temperature rises above a predetermined temperature level, of said refrigerant adjusting means to prevent a further rise in the warm water temperature.

7. An operation device as claimed in claim 1, wherein said control device is adapted to effect control, when the warm water temperature rises above a predetermined temperature level, of said solution adjusting and feeding means to prevent a further rise in the warm water temperature.

8. An operation device as claimed in any one of claims 1-7, wherein each of said solution adjusting and feeding means and said refrigerant flow rate adjusting means includes a pump.

9. An operation device as claimed in any one of claims 1-7, wherein each of said solution adjusting and feeding means and said refrigerant adjusting means includes a valve.

* * * * *